United States Patent
Bogomolny et al.

(10) Patent No.: US 11,935,222 B2
(45) Date of Patent: Mar. 19, 2024

(54) METHOD OF AUTOMATIC TIRE INSPECTION AND SYSTEM THEREOF

(71) Applicant: UVEYE LTD., Tel Aviv (IL)

(72) Inventors: Ilya Bogomolny, Tel-Aviv (IL); Ohad Hever, Modiin (IL); Amir Hever, Tel-Aviv (IL)

(73) Assignee: UVEYE LTD., Tel Aviv (IL)

( * ) Notice: Subject to any disclaimer, the term of this patent is extended or adjusted under 35 U.S.C. 154(b) by 461 days.

(21) Appl. No.: 17/312,207

(22) PCT Filed: Dec. 11, 2019

(86) PCT No.: PCT/IL2019/051354
§ 371 (c)(1),
(2) Date: Jun. 9, 2021

(87) PCT Pub. No.: WO2020/121306
PCT Pub. Date: Jun. 18, 2020

(65) Prior Publication Data
US 2022/0051391 A1   Feb. 17, 2022

Related U.S. Application Data

(60) Provisional application No. 62/778,916, filed on Dec. 13, 2018.

(51) Int. Cl.
*G06T 7/00* (2017.01)
*G06K 9/32* (2006.01)
(Continued)

(52) U.S. Cl.
CPC .............. *G06T 7/0004* (2013.01); *G06T 7/11* (2017.01); *G06V 20/63* (2022.01); *G06T 2207/20081* (2013.01); *G06T 2207/30108* (2013.01)

(58) Field of Classification Search
CPC .................... G06T 7/11; G06T 7/0004; G06T 2207/30108; G06T 2207/20081;
(Continued)

(56) References Cited

U.S. PATENT DOCUMENTS 10,078,892 B1    9/2018  Wang et al.
2011/0013823 A1*  1/2011  Joly .................... G01M 17/027
                                                          382/141

(Continued)

*Primary Examiner* — Sang H Nguyen
(74) *Attorney, Agent, or Firm* — BROWDY AND NEIMARK, PLLC (57) ABSTRACT

There are provided a system and a method of automatic tire inspection, the method comprising: obtaining at least one image capturing a wheel of a vehicle; segmenting the at least one image into image segments including a tire image segment corresponding to a tire of the wheel; straightening the tire image segment from a curved shape to a straight shape, giving rise to a straight tire segment; identifying text marked on the tire from the straight tire segment, comprising: detecting locations of a plurality of text portions on the straight tire segment, and recognizing text content for each of the text portions; and analyzing the recognized text content based on one or more predefined rules indicative of association between text content of different text portions at given relative locations, giving rise to a text analysis result indicative of condition of the tire.

20 Claims, 7 Drawing Sheets

(51) Int. Cl.
*G06T 7/11* (2017.01)
*G06V 20/62* (2022.01)

(58) Field of Classification Search
CPC ........ G06V 20/62; G06V 20/63; G06V 30/10; G01N 2021/8887; G01N 2021/8883; G01N 21/952; G01M 17/027
See application file for complete search history.

(56) References Cited

U.S. PATENT DOCUMENTS

| | | |
|---|---|---|
| 2014/0270466 A1 | 9/2014 | Dam et al. |
| 2014/0283591 A1* | 9/2014 | Takahashi .............. G01B 11/25 73/146 |
| 2014/0288859 A1 | 9/2014 | Wittmann |
| 2017/0160079 A1* | 6/2017 | Takebuchi .......... G01M 17/021 |
| 2018/0189939 A1* | 7/2018 | Ghidotti Piovan ..... G06T 7/136 |
| 2018/0260651 A1 | 9/2018 | Wang et al. |
| 2019/0304100 A1* | 10/2019 | Hever .................... G06T 7/174 |

\* cited by examiner

METHOD OF AUTOMATIC TIRE INSPECTION AND SYSTEM THEREOF

TECHNICAL FIELD

The presently disclosed subject matter relates, in general, to the field of vehicle inspection, and more specifically, to methods and systems for automatic tire inspection.

BACKGROUND

Current inspection of vehicles and parts thereof for wear and damages is normally performed manually at an inspection station. This requires a vehicle to be routed to a specific location where the vehicle is stopped for manual inspection which is not only costly and time consuming, but also prone to inspection errors and variations caused by specific personnel performing the inspection.

In particular, among different parts of a vehicle, tires are critical components since they are the only parts of the vehicle that have direct contact with the road. Tires can affect vehicle handling and safety due to their functions of supporting vehicle load, transmitting traction and braking forces to the road surface, absorbing road shocks, and changing and maintaining the direction of travel. For optimum performance, tires must have correct air pressure, tread depth, balance, etc., and the wheels of the vehicle must be properly installed and maintained. Thus for at least safety and economy reasons, tires have to be inspected on a regular basis.

Certain aspects of tire inspection, such as tire pressure monitoring, has been partially automated with the development of technologies. For instance, tire-pressure monitoring system (TPMS), an electronic system designed to monitor the air pressure inside the tires, has been development and used widely.

However, the current inspection systems are limited to certain functionalities, such as tire pressure and inflation, thus can only provide partial information of the tire. There is thus still a need for tire inspection to be automated in more aspects thereby providing more complete and accurate information regarding the condition of the tire.

GENERAL DESCRIPTION

In accordance with certain aspects of the presently disclosed subject matter, there is provided a computerized method of automatic tire inspection, the method being performed by a computer and comprising: obtaining at least one image acquired by an image acquisition device, the at least one image capturing a wheel of a vehicle; segmenting the at least one image into one or more image segments corresponding to one or more mechanical components of the wheel, wherein the one or more image segments include a tire image segment corresponding to a tire of the wheel, the tire image segment characterized by a curved shape; straightening the tire image segment from the curved shape to a straight shape, giving rise to a straight tire segment; identifying text marked on the tire from the straight tire segment, comprising: detecting locations of a plurality of text portions on the straight tire segment using a text detection module, and recognizing text content for each of the text portions using a text recognition module operatively connected to the text detection module; and analyzing the recognized text content based on one or more predefined rules indicative of association between text content of different text portions at given relative locations, giving rise to a text analysis result indicative of condition of the tire.

In addition to the above features, the method according to this aspect of the presently disclosed subject matter can comprise one or more of features (i) to (x) listed below, in any desired combination or permutation which is technically possible:

(i). The at least one image can be segmented using a segmentation deep learning model, the segmentation deep learning model being trained using a training dataset comprising a set of training wheel images each segmented and labeled according to one or more mechanical components comprised therein.

(ii). The one or more image segments can include a rim image segment corresponding to a rim of the wheel.

(iii). The text detection module can comprise a deep learning neural network trained using a training dataset comprising a set of straight tire segments each labeled with one or more bounding boxes containing one or more respective text portions.

(iv). The text recognition module can comprise a deep learning neural network trained using a training dataset comprising a set of image portions each containing a respective text portion and labeled with text content comprised in the respective text portion.

(v). The method can further comprise analyzing the tire image segment or the straight tire segment and computing a ratio between upper sidewall height and lower sidewall height of the tire, wherein the ratio is indicative of pressure condition of the tire.

(vi). The method can further comprise performing anomaly detection on at least the tire image segment for identifying one or more anomalies indicative of potential damages on the tire.

(vii). The anomaly detection can be performed using a unsupervised deep learning model, the unsupervised deep learning model being trained using a training dataset comprising a set of tire image segments without anomaly so that the trained model is capable of extracting features representative of a tire image segment without anomaly.

(viii). The trained deep learning model can be used in runtime to detect anomalies by extracting features representative of a runtime tire image segment, and determining whether the extracted features are consistent with the features representative of a tire image segment without anomaly.

(ix). The anomaly detection can be performed using a supervised deep learning model, the supervised deep learning model being trained using a training dataset comprising a set of tire image segments including one or more tire image segments with anomaly and one or more tire image segments without anomaly so that the trained supervised deep learning model is capable of identifying, in runtime, one or more runtime tire image segments with anomaly (x). The condition of the tire can include improper tire usage and/or improper tire installation.

In accordance with other aspects of the presently disclosed subject matter, there is provided a computerized system of automatic tire inspection, the system comprising a processor and memory circuitry (PMC) configured to: obtain at least one image acquired by an image acquisition device, the at least one image capturing a wheel of a vehicle; segment the at least one image into one or more image segments corresponding to one or more mechanical components of the wheel, wherein the one or more image segments include a tire image segment corresponding to a tire of the wheel, the tire image segment characterized by a curved shape; straighten the tire image segment from the curved shape to a straight shape, giving rise to a straight tire segment; identify text marked on the tire from the straight tire segment, the identifying comprising: detecting locations of a plurality of text portions on the straight tire segment using a text detection module, and recognizing text content for each of the text portions using a text recognition module operatively connected to the text detection module; and analyze the recognized text content based on one or more predefined rules indicative of association between text content of different text portions at given relative locations, giving rise to a text analysis result indicative of condition of the tire.

This aspect of the disclosed subject matter can comprise one or more of features (i) to (x) listed above with respect to the method, mutatis mutandis, in any desired combination or permutation which is technically possible.

In accordance with other aspects of the presently disclosed subject matter, there is provided a non-transitory computer readable storage medium tangibly embodying a program of instructions that, when executed by a computer, cause the computer to perform a method of automatic tire inspection, the method comprising: obtaining at least one image acquired by an image acquisition device, the at least one image capturing a wheel of a vehicle; segmenting the at least one image into one or more image segments corresponding to one or more mechanical components of the wheel, wherein the one or more image segments include a tire image segment corresponding to a tire of the wheel, the tire image segment characterized by a curved shape; straightening the tire image segment from the curved shape to a straight shape, giving rise to a straight tire segment; identifying text marked on the tire from the straight tire segment, comprising: detecting locations of a plurality of text portions on the straight tire segment using a text detection module, and recognizing text content for each of the text portions using a text recognition module operatively connected to the text detection module; and analyzing the recognized text content based on one or more predefined rules indicative of association between text content of different text portions at given relative locations, giving rise to a text analysis result indicative of condition of the tire.

This aspect of the disclosed subject matter can comprise one or more of features (i) to (x) listed above with respect to the method, mutatis mutandis, in any desired combination or permutation which is technically possible.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

In the following detailed description, numerous specific details are set forth in order to provide a thorough understanding of the invention. However, it will be understood by those skilled in the art that the presently disclosed subject matter may be practiced without these specific details. In other instances, well-known methods, procedures, components and circuits have not been described in detail so as not to obscure the presently disclosed subject matter.

Unless specifically stated otherwise, as apparent from the following discussions, it is appreciated that throughout the specification discussions utilizing terms such as "obtaining", "capturing", "segmenting", "training", "inspecting", "generating", "performing", "straightening", "identifying", "detecting", "recognizing", "analyzing", "learning", "using", "extracting", "determining", or the like, refer to the action(s) and/or process(es) of a computer that manipulate and/or transform data into other data, said data represented as physical, such as electronic, quantities and/or said data representing the physical objects. The term "computer" should be expansively construed to cover any kind of hardware-based electronic device with data processing capabilities including, by way of non-limiting example, the computerized system of training a neural network system for anomaly detection, the computerized system of automatic tire inspection and the processing and memory circuitry (PMC) thereof as disclosed in the present application.

The operations in accordance with the teachings herein can be performed by a computer specially constructed for the desired purposes or by a general purpose computer specially configured for the desired purpose by a computer program stored in a non-transitory computer readable storage medium.

The terms "non-transitory memory", "non-transitory storage medium" and "non-transitory computer readable storage medium" used herein should be expansively construed to cover any volatile or non-volatile computer memory suitable to the presently disclosed subject matter.

Embodiments of the presently disclosed subject matter are not described with reference to any particular programming language. It will be appreciated that a variety of programming languages may be used to implement the teachings of the presently disclosed subject matter as described herein.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that, unless specifically stated otherwise, certain features of the presently disclosed subject matter, which are described in the context of separate embodiments, can also be provided in combination in a single embodiment. Conversely, various features of the presently disclosed subject matter, which are described in the context of a single embodiment, can also be provided separately or in any suitable sub-combination. In the following detailed description, numerous specific details are set forth in order to provide a thorough understanding of the methods and apparatus.

In embodiments of the presently disclosed subject matter one or more stages illustrated in the figures may be executed in a different order and/or one or more groups of stages may be executed simultaneously and vice versa.

Figure 1:
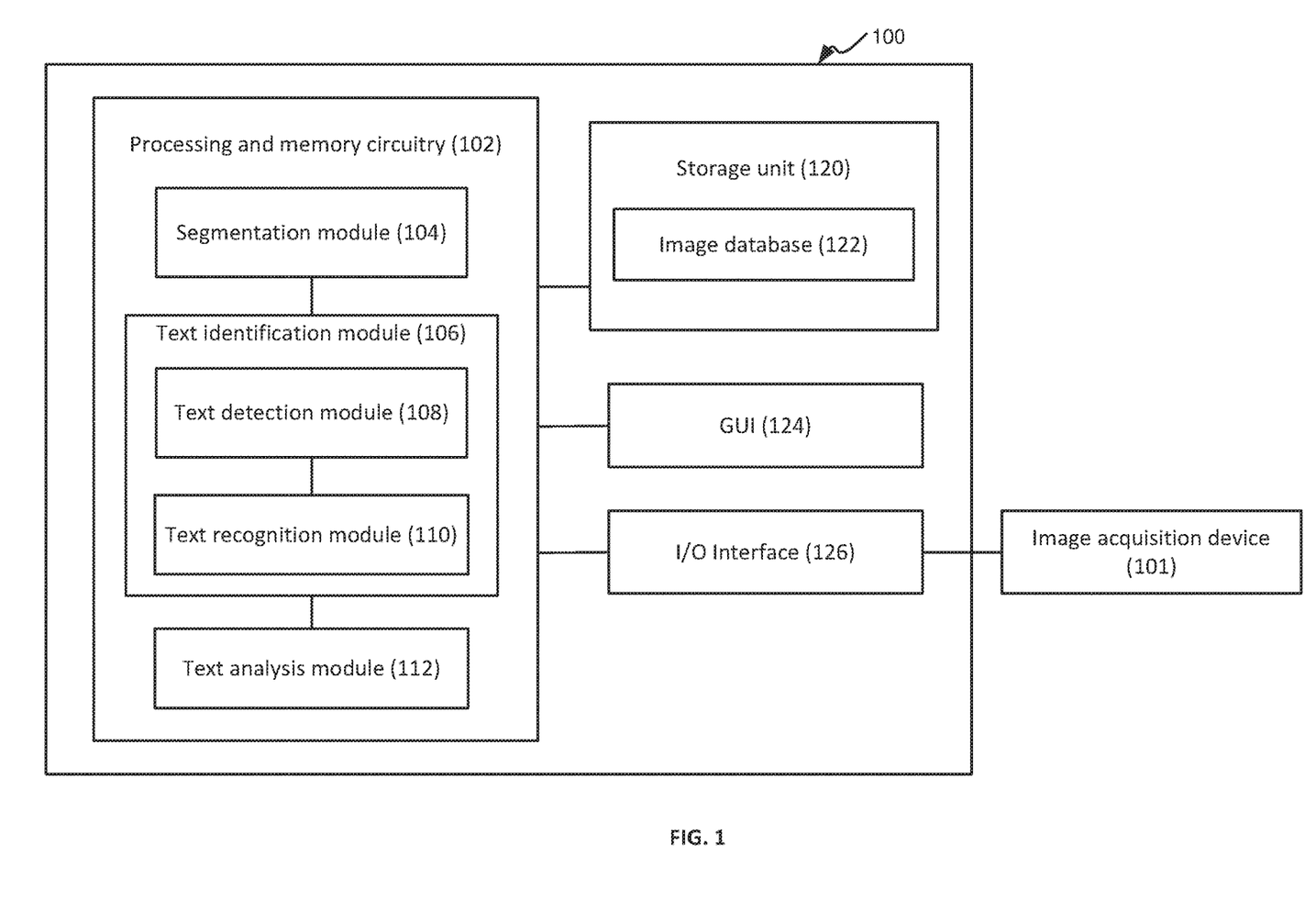
FIG. 1 schematically illustrates a block diagram of a computerized system capable of automatic tire inspection in accordance with certain embodiments of the presently disclosed subject matter.

Bearing this in mind, attention is drawn to FIG. 1, schematically illustrating a block diagram of a computerized system capable of automatic tire inspection in accordance with certain embodiments of the presently disclosed subject matter.

The system 100 illustrated in FIG. 1 is a computer-based inspection system for automatically inspecting a vehicle tire. The term "tire" used herein refers to a ring-shaped component that surrounds a wheel's rim to transfer a vehicle's load from the axle through the wheel to the ground and to provide traction on the surface traveled over. A wheel of a vehicle refers to a circular part which rotates and moves the vehicle, comprising a tire and a rim surrounded by the tire (rim refers to the metal part that the tire is mounted on). Most tires, such as those for automobiles and bicycles, are pneumatically inflated structures. Tires are used on many types of vehicles, including but not limited to cars, bicycles, motorcycles, buses, trucks, heavy equipment, and aircraft, etc., and the present disclosure is not limited to inspecting tires of a specific type of vehicles.

System 100 can be configured to obtain (e.g., via a hardware-based I/O interface 126) at least one image acquired by an image acquisition device 101, the at least one image capturing a wheel of a vehicle. The image acquisition device 101 can be operatively connected to system 100 and the acquired images can be transmitted to system 100 via wired or wireless communication.

The image acquisition device 101 can refer to any kind of imaging device(s) or general-purpose device(s) equipped with image acquisition functionalities that can be used to capture vehicle images at a certain resolution and frequency, such as, e.g., a digital camera with image and/or video recording functionalities. The image acquisition device 101 can comprise one or more camera devices located (mounted or otherwise situated) on at least one side of a vehicle and configured to capture one or more images for at least one tire of the vehicle. In some cases, there are camera devices located on both sides of the vehicle such that all tires on each side can be simultaneously inspected. The vehicle can be a moving vehicle which passes through a specific location (e.g., an inspection station or an inspection lane) equipped with the image acquisition device, or a static vehicle parked therein.

The one or more camera devices can be of various types and can provide high-resolution digital images (possibly at a high frame rate) of the vehicle within their respective fields of view. The camera devices can be situated at an appropriate height and/or angle in relation to the tires so as to capture images of tires from a proper perspective. In some embodiments, there can be provided one or more illumination devices (e.g., flash light devices) located in close proximity to the camera devices and provide illumination for the camera fields of view so as to enable the camera devices to capture images at high resolution and quality. Optionally, the image acquisition and/or the illumination can be triggered by an external sensing device which can detect the presence/approaching of a vehicle (such as, e.g., road loop, IR beam, VMD, etc.)

It is to be appreciated that the present disclosure is not limited by the number, type, coverage, and perspective of the camera devices and/or the images as being taken, nor by the specific generation methods of the images.

As illustrated, system 100 can comprise a processing and memory circuitry (PMC) 102 operatively connected to the I/O interface 126 and a storage unit 120. PMC 102 is configured to provide all processing necessary for operating system 100 which is further detailed with reference to FIG. 2. PMC 102 comprises a processor (not shown separately) and a memory (not shown separately). The processor of PMC 102 can be configured to execute several functional modules in accordance with computer-readable instructions implemented on a non-transitory computer-readable memory comprised in the PMC. Such functional modules are referred to hereinafter as comprised in the PMC. It is to be noted that the term processor referred to herein should be expansively construed to cover any processing circuitry with data processing capabilities, and the present disclosure is not limited to the type or platform thereof, or number of processing cores comprised therein. In some cases, system 100 can be operatively connected to one or more external data repositories (not shown separately).

According to certain embodiments, functional modules comprised in the PMC 102 can comprise a segmentation module 104, a text identification module 106, and a text analysis module 112. The functional modules comprised in the PMC can be operatively connected with each other. Upon obtaining the at least image acquired by the image acquisition device 101, the segmentation module 104 can be configured to segment the at least one image into one or more image segments corresponding to one or more mechanical components of the wheel. The one or more image segments can include a tire image segment corresponding to a tire of the wheel. The tire image segment is characterized by a curved shape (e.g., a ring shape) corresponding to the shape of the tire. The segmentation module 104 can be further configured to straighten the tire image segment from the curved shape to a straight shape (e.g., a line shape), giving rise to a straight tire segment.

The text identification module 106 can be configured to identify text marked on the tire from the straight tire segment. In some embodiments, the text identification module 106 can comprise a text detection module 108 and a text recognition module 110 that are operatively connected to each other. The text detection module 108 can be configured to detect locations of a plurality of text portions on the straight tire segment, and the text recognition module 110 can be configured to recognize text content for each of the text portions. The text analysis module 112 can be configured to analyze the recognized text content based on one or more predefined rules indicative of association between text content of different text portions at given relative locations, giving rise to a text analysis result indicative of condition of the tire. Details of the segmentation and text processing are described below in further detail with reference to FIG. 2.

The storage unit 120 can include an image database 122 which can be configured to store multiple acquired images of vehicle wheels. In some cases, these images can be pre-acquired from the image acquisition device 101 and stored in the image database 122 to be retrieved and processed by the PMC. In some embodiments, the image database can comprise training images and/or image segments used for training different machine learning models, as will be described in greater detail below. The storage unit 120 can also be configured to store any of the intermediate processing results, such as, e.g., the one or more image segments, the text portions, text content, etc. Optionally, the image database 122 can reside external to system 100, e.g., in one of the external data repositories, or in an external system or provider, and the images can be retrieved via the interface 126.

The I/O interface 126 can be configured to obtain, as input, the at least one image from the imaging acquisition device and/or the image database, and provide, as output, the text analysis result. Optionally, system 100 can further comprise a graphical user interface (GUI) 124 configured to render for display of the input and/or the output to the user. Optionally, the GUI can be configured to enable user-specified inputs for operating system 100.

System 100 can be used for tire inspection from various aspects. In addition or in lieu of the above described text analysis of the text marked on the tire (e.g., sidewall markings), system 100 can be used for tire pressure monitoring and/or tire damage detection etc. By way of example, system 100 can further comprise a pressure monitoring module (not shown in FIG. 1) configured to monitor tire under-inflation/over-inflation. By way of example, system 100 can further comprise a anomaly detection module (not shown in FIG. 1) configured to detect any anomaly which can be indicative of potential damages and deterioration, such as, e.g., cracking, scrapes, bulges, cuts, snags, punctures, foreign objects, or other damage resulting from daily use, as will be described in greater detail below.

As aforementioned, current tire inspection is either performed manually or with limited automated functionalities, thus can be time consuming, error-prone and provide only partial information of tire condition. The present disclosure proposes a comprehensive and automatic tire inspection which is highly efficient and provides more complete and accurate inspection results. Such technical advantages can be enabled by machine learning technologies. Details of these technical advantages and improvements are further described below with reference to FIG. 2.

It is to be noted that the system illustrated in FIG. 1 can be implemented in a distributed computing environment, in which the aforementioned functional modules shown in FIG. 1 can be distributed over several local and/or remote devices, and can be linked through a communication network.

Those versed in the art will readily appreciate that the teachings of the presently disclosed subject matter are not bound by the system illustrated in FIG. 1; equivalent and/or modified functionality can be consolidated or divided in another manner and can be implemented in any appropriate combination of software with firmware and hardware. The system in FIG. 1 can be a standalone network entity, or integrated, fully or partly, with other network entities. Those skilled in the art will also readily appreciate that the data repositories or storage unit therein can be shared with other systems or be provided by other systems, including third party equipment.

Figure 2:
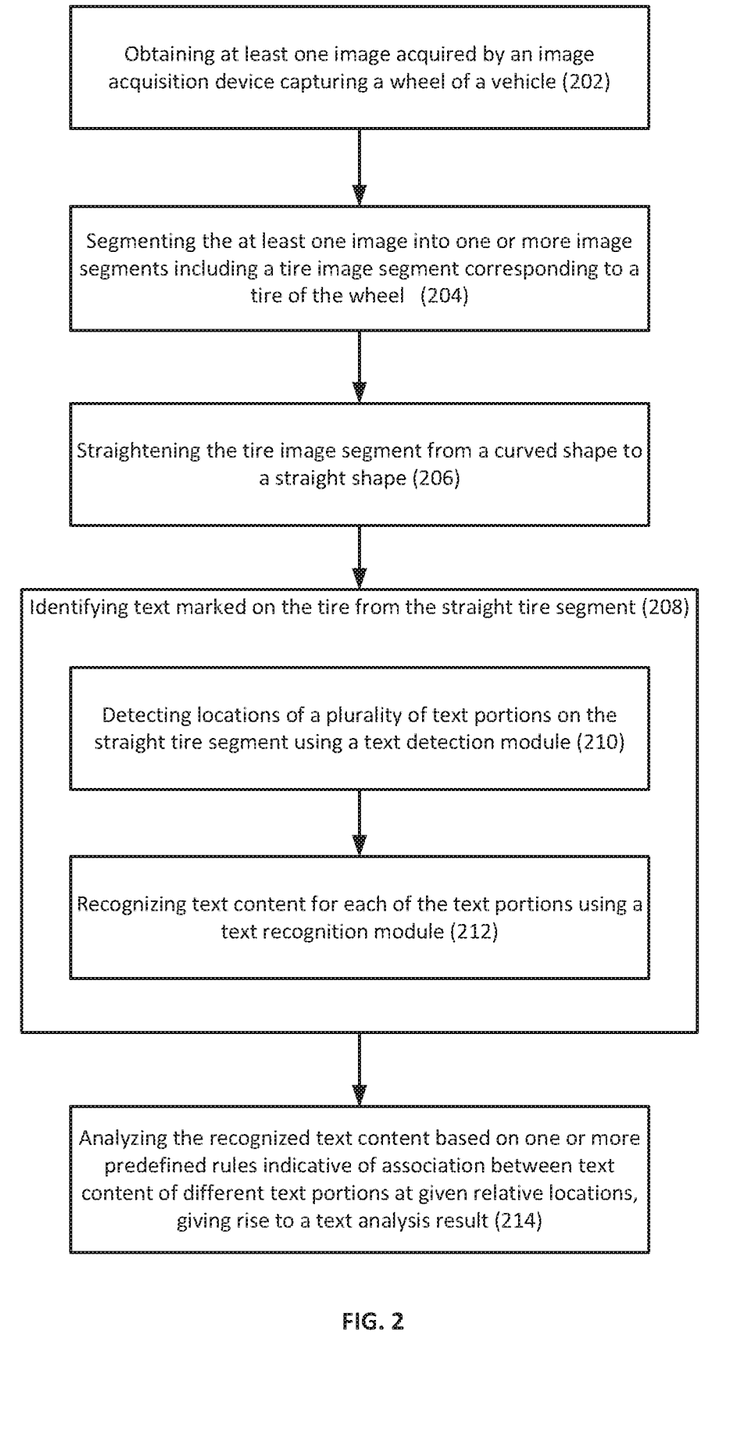
FIG. 2 illustrates a generalized flowchart of automatic tire inspection in accordance with certain embodiments of the presently disclosed subject matter.

While not necessarily so, the process of operation of system 100 can correspond to some or all of the stages of the method described with respect to FIG. 2. Likewise, the method described with respect to FIG. 2 and their possible implementations can be implemented by system 100. It is therefore noted that embodiments discussed in relation to the method described with respect to FIG. 2 can also be implemented, mutatis mutandis as various embodiments of the system 100, and vice versa.

Turning now to FIG. 2, there is illustrated a generalized flowchart of automatic tire inspection in accordance with certain embodiments of the presently disclosed subject matter.

At least one image acquired by an image acquisition device can be obtained (202) (e.g., by the PMC 102 via I/O interface 126, or from the storage unit 120, as illustrated in FIG. 1), the at least one image capturing a wheel of a vehicle.

The at least one image used herein can refer to either i) one or more original/raw images captured by any kind of image acquisition device(s) in any suitable format, or ii) one or more processed images generated after performing certain image processing procedures on the original images. In some cases, the original images acquired by the image acquisition device can capture a larger portion of the vehicle which contains not only the wheel but also other components of the vehicle exterior. For instance, the original image may contain part of the vehicle door, window, undercarriage in addition to the wheel. In such cases, the original image may need to be segmented and possibly also cropped so as to obtain a processed wheel image containing the wheel. The segmentation can be performed by estimating movement of pixels between two consecutive frames and separating pixels in circular movement (i.e., the wheel pixels) from pixels in horizontal movement.

For each of a plurality of wheels of a vehicle, one or more images can be captured. By way of example, a camera device can capture multiple images of a wheel at a given frame rate (e.g., 100-250 frames per second) when the vehicle is passing through an inspection lane. In some cases, at least one image of the multiple captured images may be selected and directly used for further processing. In some other cases, the multiple images with overlapping field of view can be combined together to form a single stitched image of the wheel. Such a stitched image, which typically has a relatively high resolution, can be used for further processing. In some cases, such a stitched image can be a 3D image.

The 3D image as mentioned above, can refer to an image which contains additional information for each pixel indicating relative or absolute depth measure of the pixel with respect to the imaging acquisition device. In some cases, a 3D image can be created based on the captured 2D images, and one or more synthesized 2D images can be extracted from the 3D image. Such synthesized 2D images can be used as input for further processing rather than the captured 2D images. This can be advantageous in some cases for the purpose of compensating perspective differences (i.e., differences caused by point of view of the camera with respect to the wheel).

Optionally, the functionality of generation of the stitched image or composite image as described above, or at least part thereof, can be integrated within the PMC 102. Alternatively, such functionality can be possibly provided by the imaging acquisition device, and the stitched image or composite image can be sent to the PMC via the I/O interface. It is to be appreciated that the present disclosure is not limited by the number, type, size, format, coverage, and perspective of the images as being captured, nor by the specific generation of methods thereof.

As aforementioned, the term wheel(s) and/or tire(s) used herein refer to the corresponding components in different types of vehicles, including but not limited to cars, bicycles, motorcycles, buses, trucks, heavy equipment, and aircraft, etc., and the present disclosure is not limited to inspecting tires/wheels of a specific type of vehicles.

The at least one image can be segmented (204) (e.g., by the segmentation module 104) into one or more image segments corresponding to one or more mechanical components of the wheel. As aforementioned, a wheel of a vehicle can at least comprise a tire and a rim surrounded by the tire. In some embodiments, the one or more image segments can include a tire image segment corresponding to the tire of the wheel. The tire image segment is characterized by a curved shape (e.g., a ring shape). In some embodiments, the one or more image segments can include a rim image segment corresponding to a rim of the wheel.

In some embodiments, the segmentation can be based on machine learning. By way of example, the segmentation can be implemented using a segmentation deep learning model, such as, e.g., a deep learning neural network (also referred to as deep neural network, or DNN). The segmentation deep learning model can be deemed as being comprised in the Segmentation module 104 of PMC 102.

DNN as used herein can refer to supervised or unsupervised DNN comprising a plurality of layers organized in accordance with respective DNN architecture. By way of not-limiting example, the layers of DNN can be organized in accordance with Convolutional Neural Network (CNN) architecture, Recurrent Neural Network architecture, Recursive Neural Networks architecture, GAN architecture or otherwise. Optionally, at least some of the layers can be organized in a plurality of DNN sub-networks. Each layer of DNN can include multiple basic computational elements (CE) typically referred to in the art as dimensions, neurons, or nodes.

Generally, CEs of a given layer can be connected with CEs of a preceding layer and/or a subsequent layer. Each connection between the CE of a preceding layer and the CE of a subsequent layer is associated with a weighting value. A given CE can receive inputs from CEs of a previous layer via the respective connections, each given connection being associated with a weighting value which can be applied to the input of the given connection. The weighting values can determine the relative strength of the connections and thus the relative influence of the respective inputs on the output of the given CE. The given CE can be configured to compute an activation value (e.g. the weighted sum of the inputs) and further derive an output by applying an activation function to the computed activation. The activation function can be, for example, an identity function, a deterministic function (e.g., linear, sigmoid, threshold, or the like), a stochastic function or other suitable function. The output from the given CE can be transmitted to CEs of a subsequent layer via the respective connections. Further to the weighting values, there can be threshold values (including limiting functions) associated with the connections and CEs.

The weighting and/or threshold values of a DNS can be initially selected prior to trainings and can be further iteratively adjusted or modified during training to achieve an optimal set of weighting and/or threshold values in a trained DNN. After each iteration, a difference can be determined between the actual output produced by DNN and the target output associated with the respective training set of data. The difference can be referred to as an error value. Training can be determined to be complete when a cost function indicative of the error value is less than a predetermined value, or when a limited change in performance between iterations is achieved. Optionally, at least part of the DNN subnetworks (if any) can be trained separately prior to training the entire DNN.

A set of DNN input data used to adjust the weights/thresholds of a deep neural network is referred to hereinafter as a training set or training dataset or training data.

In some embodiments, the segmentation deep learning model (e.g., the segmentation DNN) can be trained using a training dataset comprising a set of training wheel images each segmented and labeled according to one or more mechanical components comprised therein. The training wheel images and the labels corresponding to segments are provided to the segmentation DNN for training. The training process is to optimize the model so that it can correctly predict segmentation label (e.g., pixel-wise segmentation label) of a wheel image. In some cases, different training datasets covering images of various types of wheels (e.g., wheels of different types of vehicles) need to be provided so as to train the model to be able segment different types of incoming wheel images in runtime.

It is noted that the teachings of the presently disclosed subject matter are not bound by the DNN architecture as described above.

It is to be noted that the partition of a wheel into mechanical components may vary, e.g., it is possible that certain mechanical component can be further partitioned into sub-components. Thus it is to be appreciated that the correspondence/mapping between the image segments and mechanical components are not fixed and can be adapted accordingly. For instance, one image segment can correspond to one or more mechanical components, or alternatively, one mechanical component can correspond to one or more input segments. The present disclosure is not limited by the specific partition of mechanical components and/or the correspondence between the image segments and mechanical components.

Figure 3:
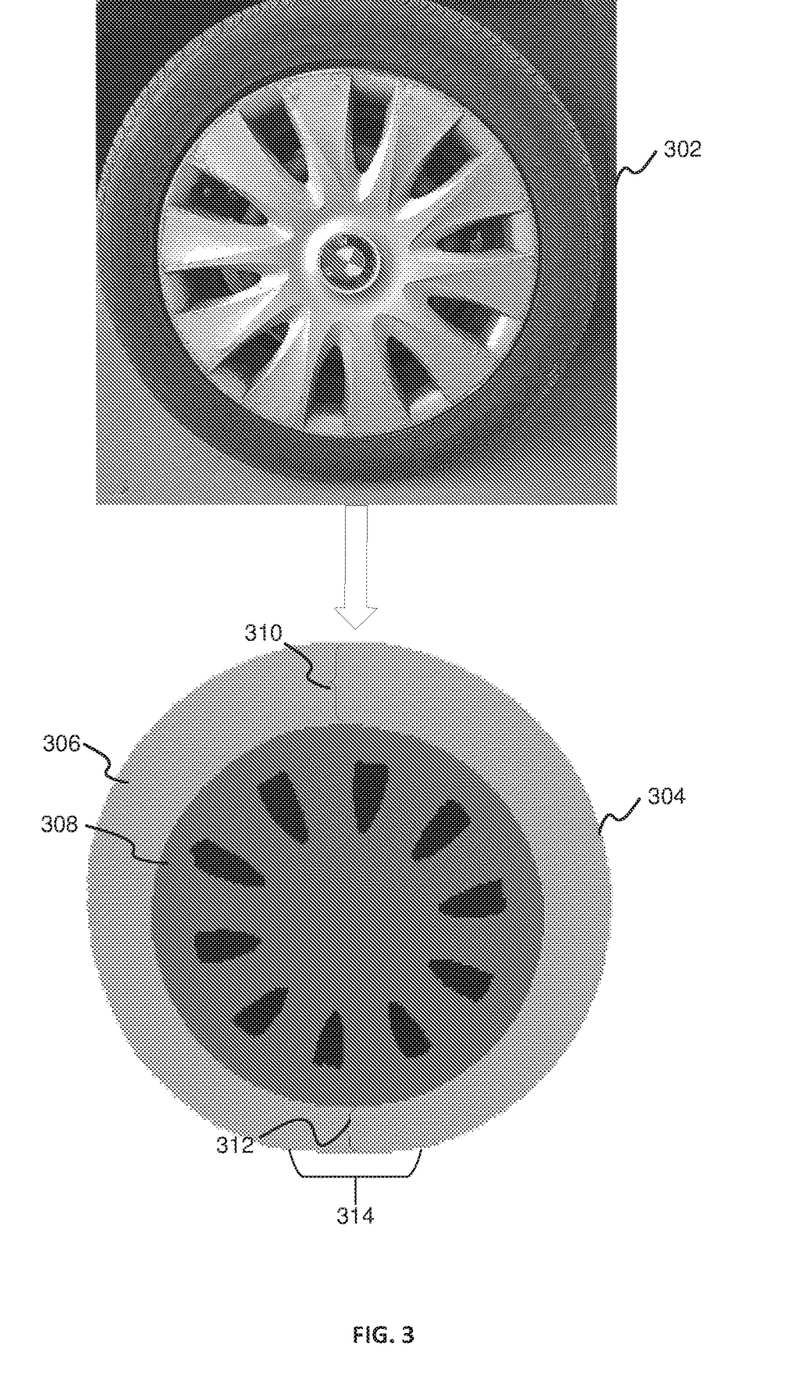
FIG. 3 illustrates an example of a wheel image and corresponding segments in accordance with certain embodiments of the presently disclosed subject matter.

FIG. 3 illustrates an example of a wheel image and corresponding segments in accordance with certain embodiments of the presently disclosed subject matter. As shown, the exemplary wheel image 302 captures a wheel of a vehicle. The wheel image 302 is segmented into image segments 306 and 308 as illustrated in 304. The segmentation is performed such that the image segments 306 and 308 respectively correspond to a tire component and a rim component of the wheel. Taking the image segment 306 for example, in the current example, there is one segment 306 corresponding to the entire tire component. However, in other cases, there may be possibly one or more sub-segments corresponding to certain parts of the tire, such as, e.g., a sub-segment corresponding to the tread of the tire, and a sub-segment corresponding to the rest of the tire, etc.

Referring back to FIG. 2 now, the tire image segment can be straightened (206) (e.g., by the segmentation module 104) from the curved shape to a straight shape, giving rise to a straight tire segment. The technical advantage of straightening the tire image segment is that the text identification as will be described below with reference to block 208 performs better on a straight image segment than on a curved one, in terms of both efficiency and accuracy.

According to certain embodiments, in order to straighten the tire image segment, the center of the wheel/tire needs to be identified based on the segmented image, i.e., the one or more image segments, and the tire image segment can be unwrapped according to the identified center point, e.g., by converting the image segment from Cartesian coordinates to polar coordinates. In some cases, the image segments may need to be pre-adjusted for purpose of compensating any difference caused by perspective of the imaging acquisition device with respect to the wheel. The pre-adjustment can be done, e.g., by detecting the tire boundaries (from, e.g., the tire image segment) and transforming the shape of the tire in such a way that it will mostly resemble a circle (rather than an ellipse). Such transformation can compensate perspective differences.

Figure 4:
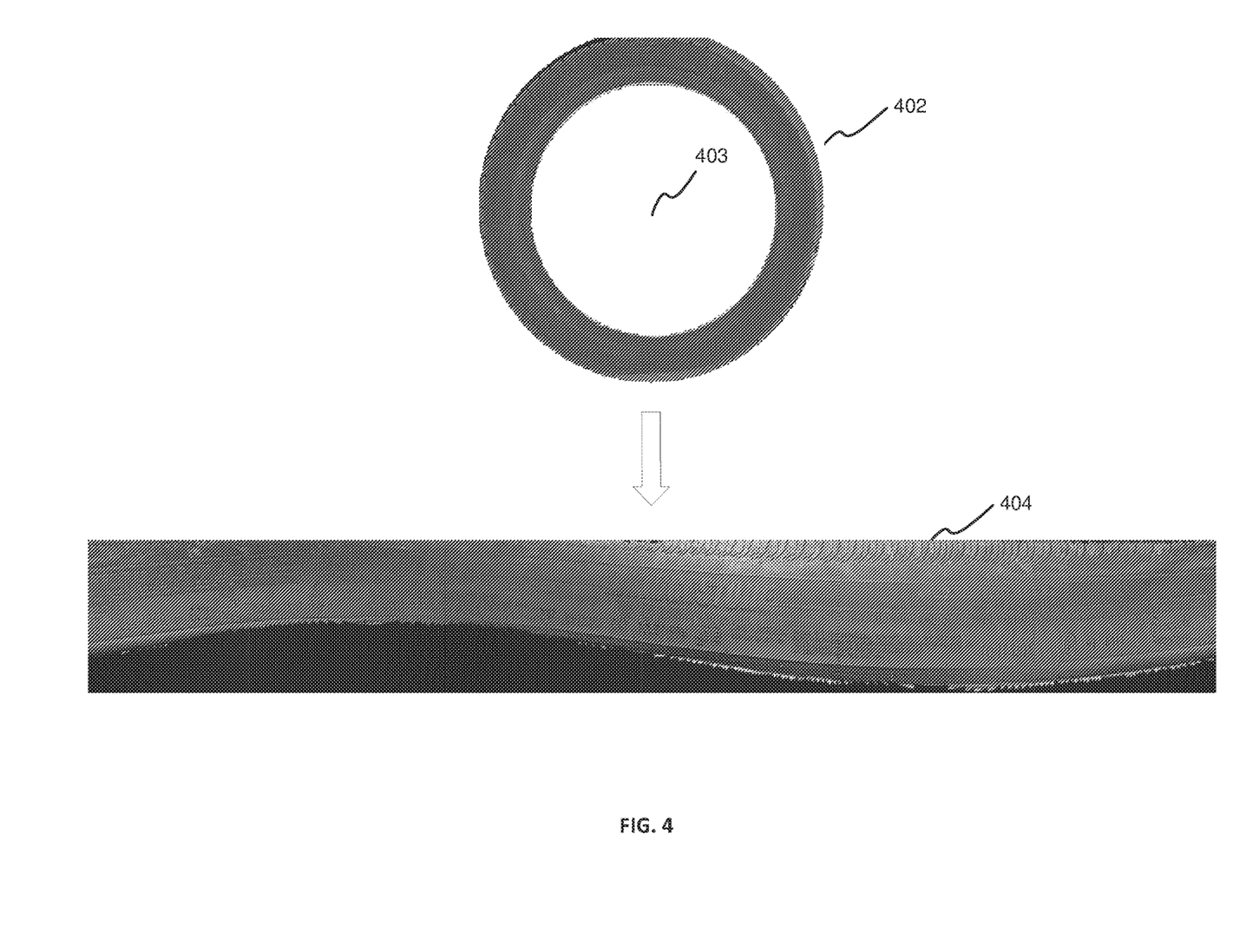
FIG. 4 illustrates an exemplary tire image segment and a corresponding straight tire segment in accordance with certain embodiments of the presently disclosed subject matter.

Turning now to FIG. 4, there is illustrated an exemplary tire image segment and a corresponding straight tire segment in accordance with certain embodiments of the presently disclosed subject matter.

FIG. 4 shows a tire image segment 402 which is obtained after the segmentation of an acquired tire image, as described above. The center of the tire 403 can be identified based on the tire image segment 402. The tire image segment 402 can then be unwrapped/straightened to a straight tire segment 404 according to the center of the tire 403. This can be done, for example, by converting the image coordinate systems as described above. As shown, in some cases, the straight tire segment 404 may not be completely straight, i.e., there may be some parts that still have small curves due to the unwrapping process. However, as long as the entire tire segment is in a mostly-straight form, it can be considered as a straight tire segment since such tire segment can be effectively used for the text identification process as will be described below.

Continuing with the description of FIG. 2, text marked on the tire can be identified (208) (e.g., by the text identification module 106) from the straight tire segment. Specifically, locations of a plurality of text portions can be detected (210) (e.g., by the text detection module 108) on the straight tire segment. Text content for each of the text portions can be recognized (212) (e.g., by the text recognition module 110 operatively connected to the text detection module).

According to certain embodiments, text marked on the tire refer to tire sidewall markings including standardized data characterizing the tire, such as, e.g., dimensions/sizes, construction, assembly, operating characteristics and manufacture etc. By way of example, there can be a series of numbers and letters marked on the sidewall, separated by a slash mark, such as, e.g., "P195/55R16", where P indicates the type of the tire which in the present example is P-Metric tire intended for passenger vehicles, the first three-digit number 195 (before the slash mark) indicates the tire width (in this example, the width is 195 millimeter), the two-digit number 55 after the slash mark indicates aspect ratio of the tire (in the present example, 55 means that the sidewall height is equal to 55% of the tire width), the letter after the two-digit number 55 indicates construction of the tire (in the present example, R stands for Radial, which means the layers run radially across the tire), and the last two-digit number 16 indicates wheel diameter which is the size of the wheel that the tire is intended to fit.

By way of another example, there can be a Department of Transportation (DOT) code marked on the sidewall, where the "DOT" symbol indicates that the tire complies with all applicable Motor Vehicle Safety Standards as required by the Department of Transportation in the United States, and the series of letters and numbers following the letters "DOT" refers to Tire Identification Number (TIN) consisting of up to 12 numbers and letters to identify the manufacturer and the week and year the tire was manufactured.

Thus, the tire sidewall markings, once properly detected and recognized, can provide useful information for determining the tire's installation, usages and current condition.

In some embodiments, the text detection as described with reference to block 210 can be based on machine learning. By way of example, the text detection can be implemented using a text detection deep learning model, such as, e.g., a deep learning neural network (DNN). The text detection deep learning model can be deemed as being comprised in the text detection module 108 of PMC 102.

In some embodiments, the text detection deep learning model (e.g., the text detection DNN) can be trained using a training dataset comprising a set of straight tire segments each labeled with one or more polygons/bounding boxes containing one or more respective text portions. The straight tire segments and corresponding labeled bounding boxes are provided to the text detection DNN for training. The training process is to optimize the model so that it can correctly predict locations of text portions on a segment in runtime.

According to certain embodiments, in runtime, the input to the text detection DNN can be a straight tire segment obtained as per segmentation of an acquired runtime wheel image. The output of the text detection DNN can be represented as, e.g., a list of predicted polygons/bounding boxes each containing a text portion, where the bounding boxes are in the coordinates of the straight tire segment. By way of example, a text portion can refer to a single "word". The term "word" used in this context refers to any combination of textual characters appearing without spaces between them, such as, e.g., "DOT" as exemplified above. Thus the output of the text detection DNN indicates locations of a plurality of text portions contained in the straight tire segment. The polygons/bounding boxes are then cropped to images portions, each image portion corresponding to a single bounding box and containing a text portion thereof. These image portions are then provided as input to the text recognition module one by one.

In some embodiments, the text recognition as described with reference to block 212 can be based on machine learning. By way of example, the text recognition can be implemented using a text recognition deep learning model, such as, e.g., a deep learning neural network (DNN). The text recognition deep learning model can be deemed as being comprised in the text recognition module 110 of PMC 102.

In some embodiments, the text recognition deep learning model (e.g., the text recognition DNN) can be trained using a training dataset comprising a set of image portions each containing a respective text portion and labeled with text content comprised in the respective text portion. The image portions and corresponding labeled text content are provided to the text recognition DNN for training. The training process is to optimize the model so that it can correctly predict text content in image portions in runtime. The output of the text recognition DNN is an ordered list of predicted text content (e.g., text characters) corresponding to the set of input image portions (i.e., in the same order as the input image portions in the set).

According to certain embodiments, the text detection DNN and the text recognition DNN are operatively connected to each other and can be trained together or independently. Optionally, non-maximum suppression (NMS) can be used as an intermediate module between the text detection DNN and the text recognition DNN for the purpose of removing possible duplicates or overlaps among the output bounding boxes and choose the most promising predictions to provide to the text recognition DNN.

Once the text content of each text portion is recognized, the recognized text content can be analyzed (214) (e.g., by the text analysis module 112) based on one or more predefined rules indicative of association between text content of different text portions at given relative locations, giving rise to a text analysis result indicative of condition of the tire. The one or more predefined rules are specifically configured in accordance with the special arrangement and positioning of text as marked on the tire, and can be used to analyze the recognized text so as to estimate the condition of the tire. Continuing with previous examples, one of the predefined rules can be that the numbers identified before and after a slash mark represent respectively tire width and aspect ratio, and a sidewall height can be computed using these numbers. Another rule can be that the number sequence identified after the letter "DOT" represent a Tire Identification Number (TIN) indicative of the manufacturer location and the week and year the tire was manufactured, as described below with further details in FIG. 6.

Figure 5:
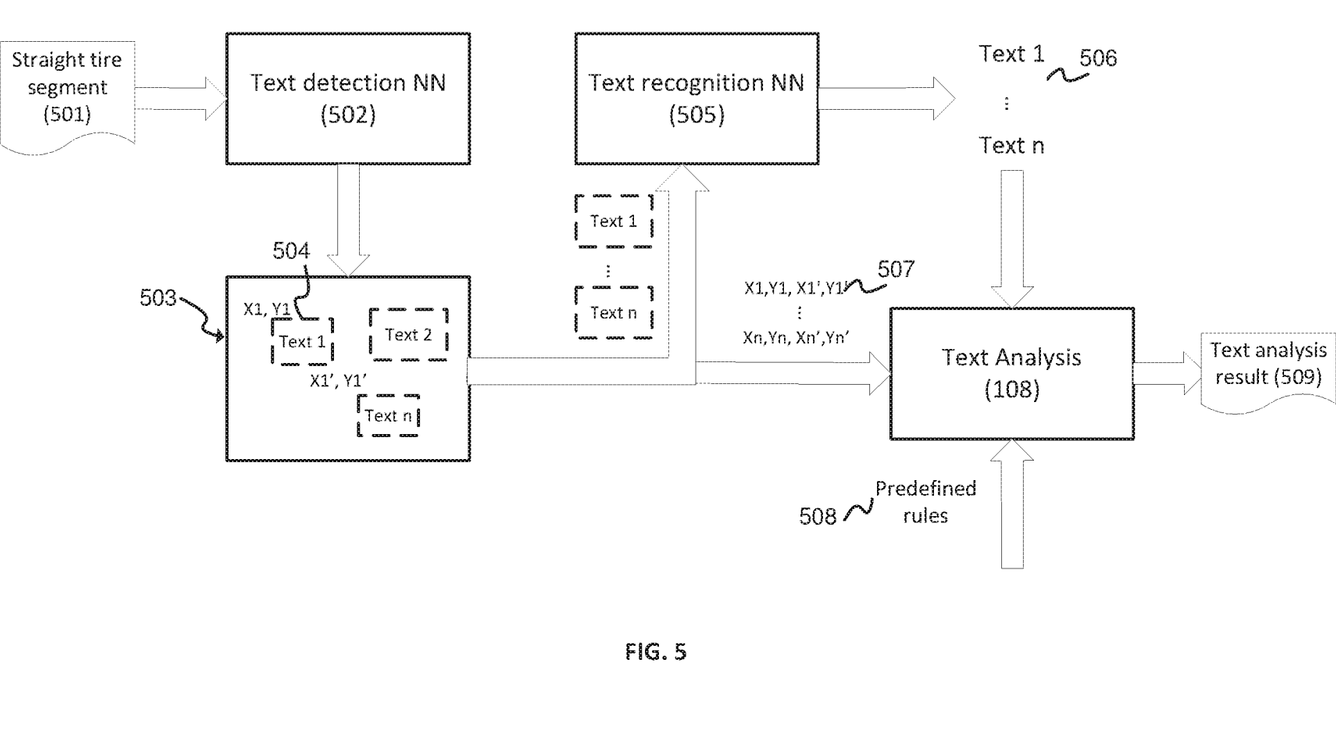
FIG. 5 illustrates a schematic diagram of text detection and text recognition in accordance with certain embodiments of the presently disclosed subject matter.

Turning now to FIG. 5, there is illustrated a schematic diagram of text detection and text recognition in accordance with certain embodiments of the presently disclosed subject matter.

A straight tire segment 501 containing text portions is provided as input to a text detection neural network (NN) 502. After processing, the output of the text detection NN 502 is a list of predicted polygons/bounding boxes 503 each containing a text portion (i.e., text 1, text 2, . . . text n, as illustrated in FIG. 5). The location of each bounding box is illustrated in the coordinates of the straight tire segment. For instance, the text portion "text 1" is identified with coordinates of the left upper corner pixel (X1, Y1) and the right bottom corner pixel (X1', Y1'). The bounding boxes 503 are cropped to images portions, each image portion corresponding to a single bounding box and containing a text portion thereof. For instance, the bounding box containing text portion "text 1" can be cropped to a corresponding image portion 504. The image portions containing respective text portions are provided as input to the text recognition NN 505 in an order of 1 to n. The output of the text recognition NN 505 is an ordered list (i.e., in the same order of 1 to n) of predicted text content 506 (i.e., text 1, text 2, . . . text n) corresponding to the input image portions. The ordered list of predicted text content 506 and the corresponding list of locations 507 of the text portions that contain the text content are provided as input to the text analysis module 108, which performs text analysis on the inputs in accordance with one or more predefined rules 508, giving rise to a text analysis result 509.

Figure 6:
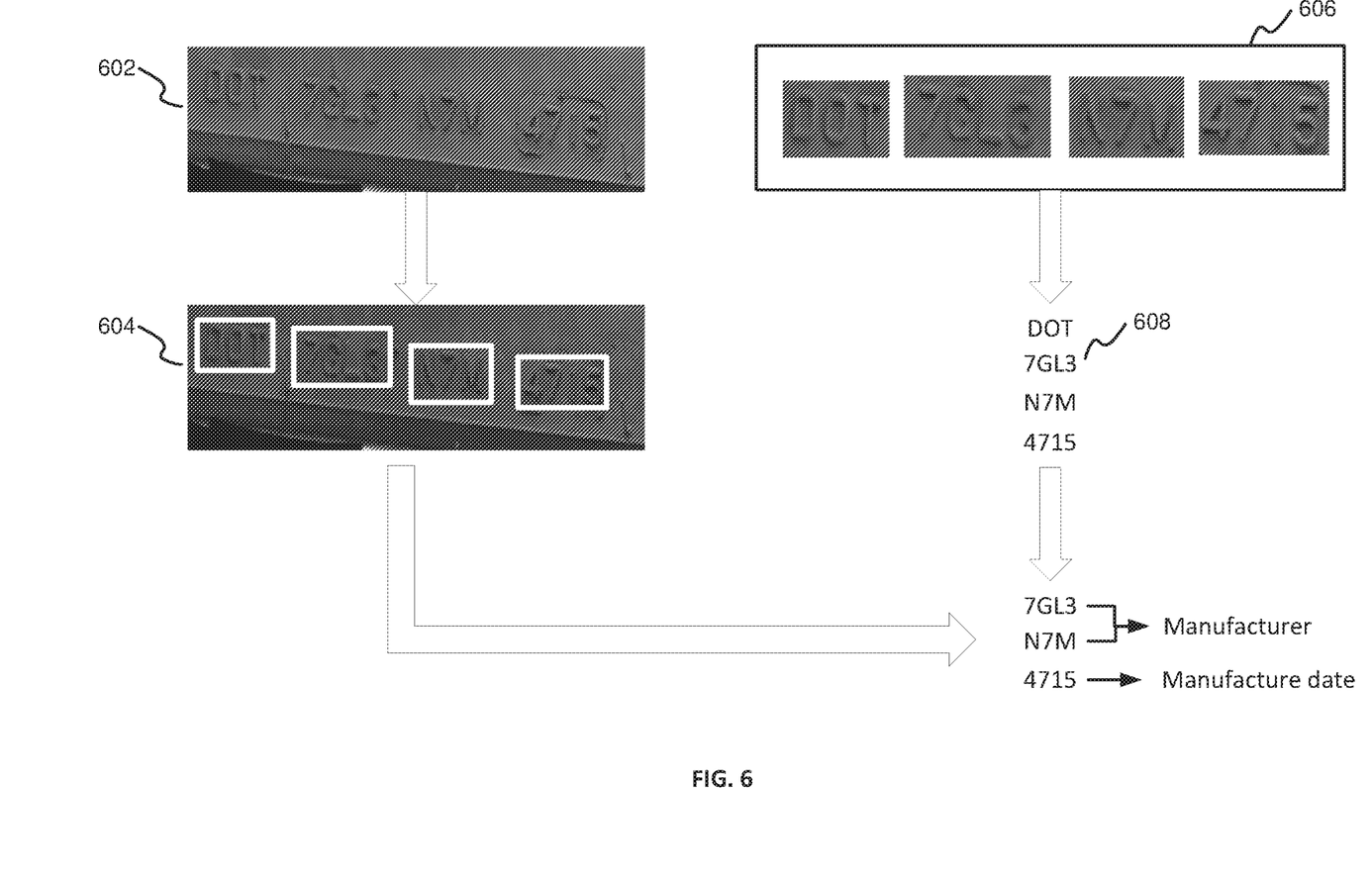
FIG. 6 shows an example of text detection and text recognition on a straight tire segment in accordance with certain embodiments of the presently disclosed subject matter.

Turning now to FIG. 6, there is illustrated an example of text detection and text recognition on a straight tire segment in accordance with certain embodiments of the presently disclosed subject matter.

For illustrative purposes, there is shown a part of a straight tire segment 602 which can be provided as input to the text detection NN 502 as illustrated in FIG. 5. After text detection, the output 604 illustrates four predicted bounding boxes (marked with white square) each containing a text portion. Four image portions 606 corresponding to the bounding boxes are cropped and provided as input to the text recognition NN 505. The output 608 of the text recognition NN 505, which is a list of predicted text content corresponding to the four image portions 606, is analyzed by the text analysis module together with the corresponding locations of the text portions as provided by the output 604 of the text detection NN 502. As exemplified in the present case, the text content of the first text portion is recognized as "DOT". Thus the predefined rule used in the analysis is that the number sequence identified after the letter "DOT" represent a Tire Identification Number (TIN) indicative of the manufacturer and the week and year the tire was manufactured. Specifically, the text content of the second text portion and the third text portion represents the manufacturer, and the text content of the last text portion refers to the week and year of the manufacture (e.g., 47th week of the year 2015 in this case).

Since a lot of tire information is represented on the tire in the form of numerical and symbolic representation, text analysis of such text content independently can be rather difficult without creating association between different text portions with relative positions. By identifying such associations between text portions and using corresponding rules indicative of such associations to perform the text analysis, the text analysis can be more efficient, and the analysis result can be more accurate and informative of the tire condition. By way of example, the condition of the tire can include one or more of the following: improper tire usage and/or improper tire installation. For instance, the tire installed is not suitable for the current season, the tire is installed improperly (e.g., inside-out), the tire has been used for too long, the size of the tire does not fit the vehicle, etc.

Having described above tire inspection in the aspect of text identification and analysis of the tire sidewall markings, according to certain embodiments, additionally or alternatively, the tire inspection can include tire pressure inspection. This can be done by monitoring certain tire characteristics indicative of tire pressure condition. The tire characteristics in this aspect can include, e.g., sidewall height(s), tire tread contact surface with ground, etc.

In some embodiments, tire pressure inspection can be performed by analyzing the tire image segment or the straight tire segment and computing a ratio between upper sidewall height (sidewall height refers to thickness of the tire rubber between the rim edge and the tire surface) and lower side-wall height of the tire. The ratio can be indicative of pressure condition of the tire. For instance, as illustrated in FIG. 3, the upper sidewall height 310 and lower sidewall height 312 can be measured from the tire image segment, and the ratio thereof can be calculated. In some cases, the measured heights may need to be adjusted, due to the perspective difference caused by the point of view of the imaging acquisition device. This can be done, e.g., by adjusting the heights according to the tire size which can be indicated by the text recognition result (e.g., by recognized text content informative of the tire size), as well as the shape transformation (e.g., from an ellipse to a circle) that can compensate perspective differences, as described above.

In some further embodiments, since the area of the contact surface of the tire tread with the ground varies under different inflation pressures, this can be used for estimating the tire pressure condition. For instance, as illustrated in FIG. 3, the length of the contact surface 314 can be measured (i.e., the distance between the two side endpoints of the contact surface of the tire) and used as an indication of the tire pressure condition. In some cases, the measured length may need to be normalized according to the size of the tire.

According to certain embodiments, additionally or alternatively, the tire inspection can include tire anomaly detection. Anomaly in the context of anomaly detection can refer to any item, object or observation appeared in an image that does not conform to an expected pattern, behavior or other items in the image. Typically an identified anomaly can indicate certain kinds of potential defects, threats, malfunctions, etc. Anomaly detection can be performed on at least the tire image segment for identifying one or more anomalies indicative of potential damages on the tire. As aforementioned, potential damages of a tire can include, such as, e.g., cracking, scrapes, bulges, cuts, snags, punctures, foreign objects, or other deterioration resulting from daily use. It is to be noted that the anomaly referred to herein should be construed to include at least one anomaly, and the present disclosure is not limited by the number of anomalies generated or detected in one image.

According to certain embodiments, anomaly detection can be performed using machine learning and can be implemented in various ways with different types of machine learning models. In one embodiment, the anomaly detection can be performed using unsupervised learning, such as, e.g., a unsupervised deep learning model, or DNN. The unsupervised deep learning model can be trained using a training dataset comprising a set of tire image segments without anomaly, so that the trained model is capable of extracting features representative of a tire image segment without anomaly. The trained deep learning model can be used in runtime to detect possible anomalies on a nuntime tire image segment by extracting features representative of the runtime tire image segment, and determining whether the extracted features are consistent with the features representative of a tire image segment without anomaly. In one example, such a DNN can be implemented as an autoencoder.

Autoencoder is a type of neural network which is normally used for the purpose of data reproduction by learning efficient data coding. An autoencoder always consists of two parts, the encoder and the decoder. The autoencoder learns to compress data from the input layer into a short code (i.e., the encoder part), and then decompress that code into an output that closely matches the original data (i.e., the decoder part). The output of the encoder part is referred to as code, latent variables, or latent representation which represents extracted features representative of the input tire image segment. The autoencoder normally has an input layer, an output layer and one or more hidden layers (e.g., one or more convolutional layers and deconvolutional layers) connecting them. The output layer has the same number of nodes as the input layer with the purpose of reconstructing its own inputs.

During training, for each tire image segment without anomaly that is fed into the autoencoder, the autoencoder learns to extract representative features therefrom and reconstruct a tire image segment corresponding to the input image segment based on the extracted features. Once the training is complete, the extracted features representative of a tire image segment without anomaly can be obtained from the trained model. In runtime inspection, the autoencoder extracts features (e.g., in the form of feature vectors)) representative of a runtime tire image segment, and compares the extracted features with the features representative of a tire image segment without anomaly in order to determine if an anomaly is detected. By way of example, each feature vector in the encoder output can correspond to an image patch in the input image segment. Per comparison, if an un-matched feature vector is identified, an anomaly can be predicted for the image patch corresponding to such vector. Therefore, the prediction in such cases can be patch-wise prediction. It is to be noted that the size of the image patches can be controlled by the scale of the input image segment and the number of down sampling operations performed in the encoder network.

In a further example, the DNN can comprise an autoencoder operatively connected with a classifier. The extracted features from the autoencoder can be provided as input to the classifier so that the classifier can learn to predict, based on the features, whether there is anomaly in the tire image segment or not.

In another embodiment, the anomaly detection can be performed using supervised learning, such as, e.g., a supervised deep learning model, or DNN. The supervised deep learning model can be trained using a training dataset comprising a set of tire image segments including one or more tire image segments with anomaly and one or more tire image segments without anomaly. The tire image segments and corresponding labels indicative of presence/absence of anomaly are provided to the DNN for training. The training process is to optimize the model so that it can learn to distinguish there between and can correctly predict whether there is presence of anomaly on a tire image segment or not. Therefore, the trained supervised deep learning model is capable of identifying, in runtime, one or more runtime tire image segments with anomaly. In one example, such DNN can be implemented as a classifier. The prediction of anomaly can be pixel-wise prediction or segment-wise prediction.

In yet another embodiment, a Generative adversarial network (GAN) structure can be used for perform the training GAN refers to a neural network system that is composed of two neural networks contesting with each other in a zero-sum game framework. The generator network is trained to generate samples/instances by transforming data vectors into a specific data distribution of interest, while the discriminator network is trained to discriminate between instances from the true data distribution and instances produced by the generator. Once trained, the discriminator network therein can be used as the anomaly detection model for detecting potential anomalies in runtime.

In some cases, the anomaly detection can be performed on all of the one or more image segments and not only on the tire image segment. In such cases, the input to the anomaly detection machine learning model can additionally include segmentation information of the input tire image segment, as obtained after the segmentation process described with reference to block 204. For instance, the segmentation information can be provided in the form of a pixel-wise segmentation mask containing a segmentation label for each pixel in the tire image segment. By providing such information as input to the DNN in addition to the input tire image segment, the prediction result of the machine learning model can be more accurate.

Figure 7:
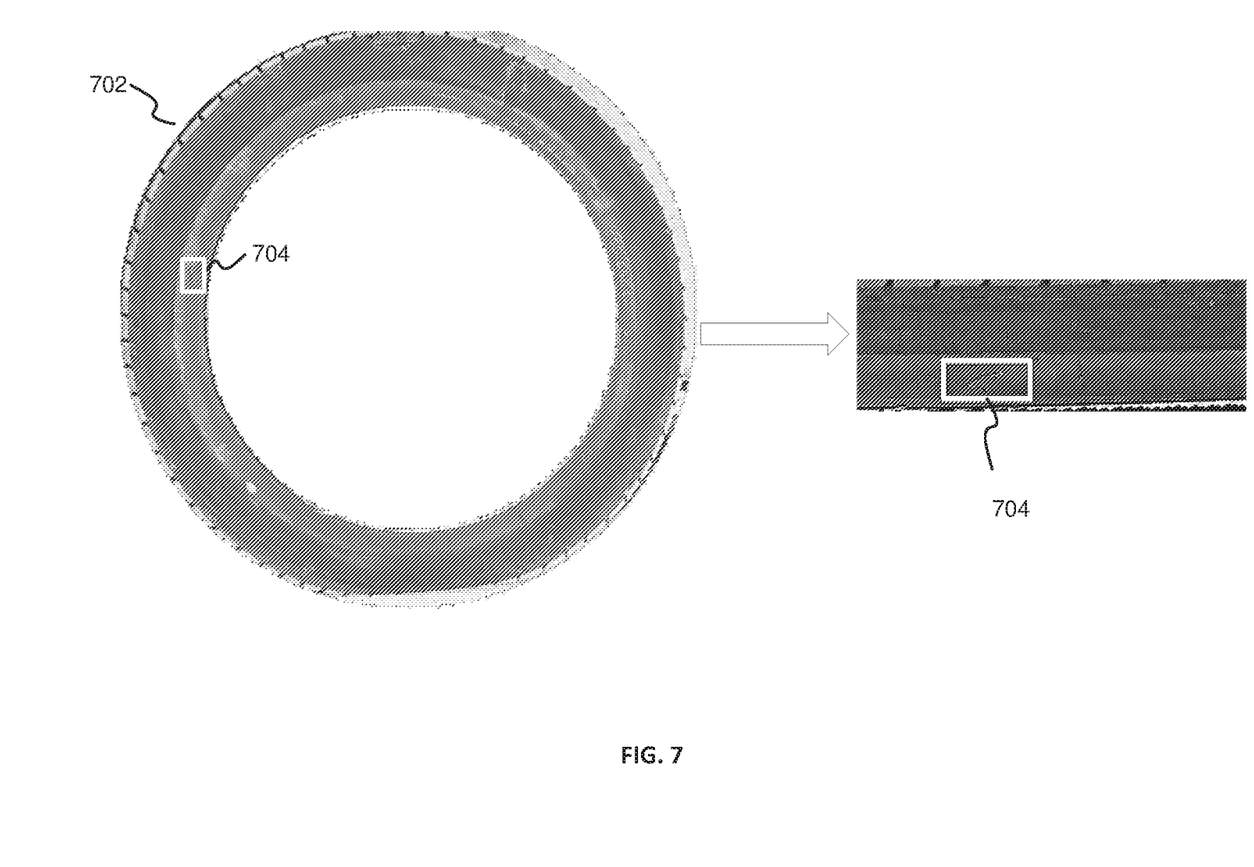
FIG. 7 illustrates an example of detected anomaly on a tire image segment in accordance with certain embodiments of the presently disclosed subject matter.

Referring to FIG. 7 now, there is illustrated an example of detected anomaly on a tire image segment in accordance with certain embodiments of the presently disclosed subject matter.

An tire image segment 702 is provided as input to anomaly detection machine learning model, and an anomaly 704 is detected. As can be seen from the right zoomed-in figure, the anomaly 704 is a scratch on the tire.

It is appreciated that the examples and embodiments illustrated in the present description are by no means inclusive of all possible alternatives but are intended to illustrate non-limiting examples only.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

It will also be understood that the system according to the invention may be, at least partly, implemented on a suitably programmed computer. Likewise, the invention contemplates a computer program being readable by a computer for executing the method of the invention. The invention further contemplates a non-transitory computer readable memory or storage medium tangibly embodying a program of instructions executable by the computer for executing the method of the invention.

The non-transitory computer readable storage medium causing a processor to carry out aspects of the present invention can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Those skilled in the art will readily appreciate that various modifications and changes can be applied to the embodiments of the invention as hereinbefore described without departing from its scope, defined in and by the appended claims.

The invention claimed is:

1. A computerized method of automatic tire inspection, the method being performed by a computer and comprising:
    obtaining at least one image acquired by an image acquisition device, the at least one image capturing a wheel of a vehicle;
    segmenting the at least one image into one or more image segments corresponding to one or more mechanical components of the wheel, wherein the one or more image segments include a tire image segment corresponding to a tire of the wheel, the tire image segment characterized by a curved shape;
    straightening the tire image segment from the curved shape to a straight shape, giving rise to a straight tire segment;
    identifying text marked on the tire from the straight tire segment, comprising:
    detecting locations of a plurality of text portions on the straight tire segment using a text detection module, and
    recognizing text content for each of the text portions using a text recognition module operatively connected to the text detection module; and
analyzing the recognized text content based on one or more predefined rules indicative of association between text content of different text portions at given relative locations, giving rise to a text analysis result indicative of condition of the tire.

2. The computerized method according to claim 1, wherein the at least one image is segmented using a segmentation deep learning model, the segmentation deep learning model being trained using a training dataset comprising a set of training wheel images each segmented and labeled according to one or more mechanical components comprised therein.

3. The computerized method according to claim 1, wherein the one or more image segments include a rim image segment corresponding to a rim of the wheel.

4. The computerized method according to claim 1, wherein the text detection module comprises a deep learning neural network trained using a training dataset comprising a set of straight tire segments each labeled with one or more bounding boxes containing one or more respective text portions.

5. The computerized method according to claim 1, wherein the text recognition module comprises a deep learning neural network trained using a training dataset comprising a set of image portions each containing a respective text portion and labeled with text content comprised in the respective text portion.

6. The computerized method according to claim 1, further comprising analyzing the tire image segment or the straight tire segment and computing a ratio between upper sidewall height and lower sidewall height of the tire, wherein the ratio is indicative of pressure condition of the tire.

7. The computerized method according to claim 1, further comprising performing anomaly detection on at least the tire image segment for identifying one or more anomalies indicative of potential damages on the tire.

8. The computerized method according to claim 7, wherein the anomaly detection is performed using a unsupervised deep learning model, the unsupervised deep learning model being trained using a training dataset comprising a set of tire image segments without anomaly so that the trained model is capable of extracting features representative of a tire image segment without anomaly.

9. The computerized method according to claim 8, wherein the trained deep learning model is used in runtime to detect anomalies by extracting features representative of a runtime tire image segment, and determining whether the extracted features are consistent with the features representative of a tire image segment without anomaly.

10. The computerized method according to claim 7, wherein the anomaly detection is performed using a supervised deep learning model, the supervised deep learning model being trained using a training dataset comprising a set of tire image segments including one or more tire image segments with anomaly and one or more tire image segments without anomaly so that the trained supervised deep learning model is capable of identifying, in runtime, one or more runtime tire image segments with anomaly.

11. The computerized method according to claim 1, wherein the condition of the tire includes improper tire usage and/or improper tire installation.

12. A computerized system for automatic tire inspection, the system comprising a processor and memory circuitry (PMC) configured to:
    obtain at least one image acquired by an image acquisition device, the at least one image capturing a wheel of a vehicle;
    segment the at least one image into one or more image segments corresponding to one or more mechanical components of the wheel, wherein the one or more image segments include a tire image segment corresponding to a tire of the wheel, the tire image segment characterized by a curved shape;
    straighten the tire image segment from the curved shape to a straight shape, giving rise to a straight tire segment;
    identify text marked on the tire from the straight tire segment, the identifying comprising:
    detecting locations of a plurality of text portions on the straight tire segment using a text detection module, and
    recognizing text content for each of the text portions using a text recognition module operatively connected to the text detection module; and
    analyze the recognized text content based on one or more predefined rules indicative of association between text content of different text portions at given relative locations, giving rise to a text analysis result indicative of condition of the tire.

13. The computerized system according to claim 12, wherein the at least one image is segmented using a segmentation deep learning model, the segmentation deep learning model being trained using a training dataset comprising a set of training wheel images each segmented and labeled according to one or more mechanical components comprised therein.

14. The computerized system according to claim 12, wherein the text detection module comprises a deep learning neural network trained using a training dataset comprising a set of straight tire segments each labeled with one or more bounding boxes containing one or more respective text portions.

15. The computerized system according to claim 12, wherein the text recognition module comprises a deep learning neural network trained using a training dataset comprising a set of image portions each containing a respective text portion and labeled with text content comprised in the respective text portion.

16. The computerized system according to claim 12, wherein the PMC is further configured to perform anomaly detection on at least the tire image segment for identifying one or more anomalies indicative of potential damages on the tire.

17. The computerized system according to claim 16, wherein the PMC is configured to perform anomaly detection using a unsupervised deep learning model, the unsupervised deep learning model being trained using a training dataset comprising a set of tire image segments without anomaly so that the trained model is capable of extracting features representative of a tire image segment without anomaly.

18. The computerized system according to claim 17, wherein the trained deep learning model is used in runtime to detect anomalies by extracting features representative of a runtime tire image segment, and determining whether the extracted features are consistent with the features representative of a tire image segment without anomaly.

19. The computerized system according to claim 16, wherein the PMC is configured to perform anomaly detection using a supervised deep learning model, the supervised deep learning model being trained using a training dataset comprising a set of tire image segments including one or more tire image segments with anomaly and one or more tire image segments without anomaly so that the trained supervised deep learning model is capable of identifying, in runtime, one or more runtime tire image segments with anomaly.

20. A non-transitory computer readable storage medium tangibly embodying a program of instructions that, when executed by a computer, causing the computer to perform a method of automatic tire inspection, the method comprising:
    obtaining at least one image acquired by an image acquisition device, the at least one image capturing a wheel of a vehicle;
    segmenting the at least one image into one or more image segments corresponding to one or more mechanical components of the wheel, wherein the one or more image segments include a tire image segment corresponding to a tire of the wheel, the tire image segment characterized by a curved shape;
    straightening the tire image segment from the curved shape to a straight shape, giving rise to a straight tire segment;
    identifying text marked on the tire from the straight tire segment, comprising:
        detecting locations of a plurality of text portions on the straight tire segment using a text detection module, and
        recognizing text content for each of the text portions using a text recognition module operatively connected to the text detection module; and
    analyzing the recognized text content based on one or more predefined rules indicative of association between text content of different text portions at given relative locations, giving rise to a text analysis result indicative of condition of the tire.

\* \* \* \* \*